3,706,666
METHOD OF MANUFACTURING A LUMINESCENT OXYSULPHIDE
Roelof Egbert Schuil, Emmasingel, Eindhoven, Netherlands, assignor to U.S. Philips Corporation, New York, N.Y.
No Drawing. Filed Mar. 12, 1971, Ser. No. 123,866
Claims priority, application Netherlands, Mar. 25, 1970, 7004337
Int. Cl. C09k 1/14; C22b 59/00; C01f 17/00
U.S. Cl. 252—301.4 S
7 Claims

ABSTRACT OF THE DISCLOSURE

A method of manufacturing a luminescent oxysulphide defined by the formula $M'_{(2-x)}M_x''O_2S$ wherein M' represents Y and/or Gd and/or La and M" represents one of the rare earths and $x$ represents a number of between 0.0002 and 0.2. Sulphur is added to a strong solution of alkali metal hydroxide in water whereafter the solution is mixed with the oxide of M' and M". The mixture obtained is subsequently heated at a high temperature while it is being shut off from the air.

---

The invention relates to a method of manufacturing a luminescent oxysulphide which is defined by the formula $M'_{(2-x)}M_x''O_2S$ in which M' represents at least one of the elements yttrium, gadolinium and lanthanum and M" represents at least one of the rare earths and $x$ is a number having a value of between 0.0002 and 0.2. Furthermore, the invention relates to a luminescent oxysulphide manufactured by such a method and to a cathode-ray tube provided with a picture screen which comprises such a luminescent oxysulphide.

Luminescent oxysulphides according to the above-mentioned formula are known and are described, for example, in United Kingdom patent specifications 1,121,055 and 1,131,956. These oxysulphides may be excited both by ultraviolet radiation and by electrons and have a different emission dependent on the element used as an activator which is indicated in the formula by M". Rare earths may be used as activators with the exception of the elements gadolinium and lutetium, i.e. the elements having an atomic number of between 57 and 64 and between 64 and 71. Patricularly the oxysulphides with the element europium in a trivalent form as an activator are important, for they have a very strong red emission in that part of the spectrum which is particularly desired as the red luminescing component in the picture screen of cathode-ray tubes for the display of coloured television images.

A method of manufacturing luminescent oxysulphides is known from United Kingdom patent specification 1,163,503 in which a dry mixture of a polysulphide of an alkali metal together with oxides of the elements M' and M" is heated at a high temperature. The polysulphide is formed in situ during the heat treatment by means of thermal decomposition of, for example, a thiosulphate of an alkali metal or by thermal decomposition and reaction at a high temperature of a dry mixture of sulphur with, for example, an alkali metal carbonate. The known method has the drawback that polysulphide is formed at an instant when reaction of the oxides of M' and M" with polysulphide is already possible. In addition other reaction products are formed in addition to polysulphide in most cases. Both mentioned phenomena result in relatively little polysulphide being available during the heating process. Although a satisfactory choice of the quantities of the starting materials to be used and a suitable choice of reaction temperature and duration can assure a substantially full conversion of the oxides in oxysulphide, the oxysulphide thus obtained is found to be poorly crystallized so that in some cases recrystallization by means of a second temperature treatment is necessary.

According to the invention a method for the manufacture of a luminescent oxysulphide which is defined by the formula $M'_{(2-x)}M_x''O_2S$ in which M' represents at least one of the elements yttrium, gadolinium and lanthanum and M" represents at least one of the rare earths having an atomic number of between 57 and 64 and between 64 and 71 and $x$ is a number having a value of between 0.0002 and 0.2 in which a mixture of a polysulphide of at least one of the alkali metals with oxides of the elements M' and M" or with a mixed oxide of these elements is heated at a high tempearture is characterized in that polysulphide is first manufactured by adding sulphur to a concentrated aqueous solution of alkali metal hydroxide, that subsequently the oxide(s) of the elements M' and M" is (are) added to this solution whereafter the mixture thus obtained is heated at a high temperature in the absence of air.

In a method according to the invention the polysulphide of one or more of the alkali metals is mainly formed before the oxides of M' and M" are added and before the heat treatment at a high temperature is effected. When adding sulphur to the hydroxide solution the sulphur reacts while developing heat with the alkali metal hydroxide while forming predominantly polysulphide and furthermore sulphite and/or thiosulphate and possibly sulphide and sulphate and water. The output of polysulphide is very large in this reaction. The sulphite and/or thiosulphate formed and sulphide are converted into polysulphide during the heat treatment at a high temperature. The full reaction may be represented as follows for the case of sodium hydroxide:

$$8NaOH + 13S \rightarrow 3Na_2S_4 + Na_2SO_4 + 4H_2O$$

For potassium hydroxide and lithium hydroxide an analogous reaction process applies on the understanding that in the case of lithium hydroxide polysulphides are formed in accordance with the formula $Li_2S_2$ and $Li_2S_4$.

A method according to the invention has the advantage that the polysulphide concentration during the heat treatment at a high temperature is larger than that in the known method so that a better crystallization of the final product is obtained. The luminescent oxysulphides manufactured by means of a method according to the invention therefore generally have a higher light output which is of course very desirable.

Since relatively few side products are produced when forming polysulphides in accordance with a method according to the invention a high output per crucible may be reached at the heat treatment at a high temperature, which is an economic advantage.

A further advantage of a method according to the invention is that cheap basic materials may be used which are readily available in a pure form. It is to be noted that the use of commercially available alkali metal polysulphides as a basic material for the heating process is not quite possible in practice, for these polysulphides generally contain an inadmissible quantity of impurities and furthermore they contain relatively large quantities of water because they are very much hydroscopic. Consequently, they are difficult to store and difficult to process.

A considerable advantage of a method according to the invention is furthermore that the duration of the manufacture may be short. In the first place only one heat treatment is necessary in contrast with the known method of manufacture in which in some cases a recrystallization at a high temperature is required. In the second place the crucibles containing the reaction mixture may be placed without breaking directly in a furnace having a high temperature. When manufacturing oxysulphides, quartz crucibles are less suitable because they are attacked. Therefore alundum crucibles are generally used. These are, however, not resistant to great temperature fluctuations and can generally be heated only slowly. It has been found that in a method according to the invention the alundum crucibles can be placed without any objection in a furnace which is brought at a high temperature.

In a method according to the invention a solution is preferably used which contains at least 15% by weight of alkali metal hydroxide. It is advantageous to use a lye solution which is as strong as possible because then the reaction with sulphur proceeds most smoothly and because the used quantity of water, which must disappear during the further process, is as small as possible in that case. In the case of, for example, an NaOH solution very favourable results are obtained with a solution of approximately 25 mol NaOH per litre of water (this corresponds to approximately 1 g. of NaOH per ml. of water).

In a method according to the invention it is advantageous to add sulphur to an alkali metal hydroxide solution which is heated at a temperature of between 80° C. and the boiling point of the solution because then the reaction between sulphur and alkali metal hydroxide proceeds optimally. During this reaction heat is released and a portion of the water is evaporated. A quantity of sulphur of between 1.5 and 2 gram atoms per gram molecule of alkali metal hydroxide is preferred. In some cases notably in the manufacture of luminescent lanthanum oxysulphide a larger quantity of sulphur is, however, found to be advantageous.

The quantity of oxide (or mixed oxide) of the elements M' and M" which is mixed with the polysulphide solution is preferably chosen between 0.1 and 5 grams per gram of sulphur. When adding the oxide to the polysulphide solution a severe reaction often occurs in which much heat is developed and the greatest portion of the water present is evaporated. A liquid mixture is obtained which homogeneously engages the wall of the crucible. As a result no local temperature differences are produced in the wall of the crucible when it is placed in a highly heated furnace so that breakage of the crucible is avoided.

The reaction time and temperature may be varied within very wide limits. Generally the reaction may be carried out during a comparatively short period if the reaction temperature is high. Conversely, a producing reaction may be obtained at a low temperature if the reaction time is chosen to be long. Practical values which are preferred are reaction times of between 0.25 and 8 hours and temperatures of between 1000 and 1350° C. The average grain size of the final product can be adjusted within certain limits by means of the reaction time and temperature as well as with the quantity of polysulphide to be used, which will be further described hereinafter. Generally the mean grain size of the oxysulphide obtained is larger as the reaction temperature is higher, the reaction time is longer and the quantity of polysulphide is larger. The heat treatment at a high temperature is to be effected in the absence of air so as to prevent oxidation of the oxysulphide formed. This may be achieved by passing an inert gas, for example, nitrogen into the furnace. It is alternatively possible to use a covered crucible.

In a method according to the invention in which a lithium hydroxide solution is used as a basic material the use of lithium polysulphide which is not readily accessible in other methods is quite possible. When using lithium polysulphide a coarser crystallized luminescent oxysulphide is obtained which is advantageous when providing the luminescent oxysulphide on a screen.

The luminescent oxysulphide may be separated from the reaction product obtained by the method according to the invention by leaching with water in which the oxysulphide is very insoluble and in which the other reaction products are very soluble.

In order that the invention may be readily carried into effect it will now be described by way of a few examples.

EXAMPLE I

A solution of 100 grams of NaOH in 100 mls. of water which was brought to a temperature of approximately 90° C. was made in an alundum crucible. While stirring, 130 gms. of sulphur were added whereafter 435 gms. of $Y_{1.9}Eu_{0.1}O_3$ were added while stirring to the hot sodium polysulphide solution thus formed, during which treatment a quantity of heat was released and a thick fluid melt was formed. The crucible with contents was subsequently placed in a furnace which was at a temperature of 400° C. The temperature of the furnace was increased to 1150° C. in approximately 1 hour whereafter a heat treatment took place at this temperature for 2 hours. During the entire temperature treatment approximately 600 mls. of nitrogen were passed into the furnace per minute. After cooling subsequent to the heat treatment the reaction product was leached with water, dried and sieved. The obtained $Y_{1.9}Eu_{0.1}O_2S$ had a light output which is 103% of the light output of a standard phosphor when excited in a dismountable cathode-ray tube by electrons which have an energy of 5 kev. As a standard an oxysulphide defined by the formula $Y_{1.9}Eu_{0.1}O_2S$ was used which was manufactured by a known method. The mean grain size of the obtained oxysulphide was found to be approximately $5.1\mu$.

EXAMPLE II

In the same manner as in Example I a sodium polysulphide melt was prepared in an alundum crucible. Subsequently a quantity of $Y_{1.9}Eu_{0.1}O_3$ of 218 gms. was added while stirring whereafter a temperature treatment was used under the same circumstances as in Example I. The final product thus obtained satisfied the same formula as that in Example I but had a light output of 113% relative to the standard and has a mean grain size of approximately $7.0\mu$ in a dismountable cathode-ray tube.

EXAMPLE III

Again the same procedure as in Example I was used. The used quantity of $Y_{1.9}Eu_{0.1}O_3$ in this case was, however, 109 gms. The light output of the $Y_{1.9}Eu_{0.1}O_2S$ thus prepared was 98% and the mean grain size was $7.5\mu$.

EXAMPLE IV

The used quantity of $Y_{1.9}Eu_{0.1}O_3$ in this case whe, however, potassium polysulphide was used which was prepared by mixing 130 gms. of sulphur with a solution of 140 gms. of KOH in 100 mls. of water. When adding 435 gms. of $Y_{1.9}Eu_{0.1}O_3$ to the potassium polysulphide melt and after heating for 2 hours at 1150° C. a luminescent oxysulphide was obtained which is defined by the formula $Y_{1.9}Eu_{0.1}O_2S$ and which had a light output of 93% and a mean grain size of $6.8\mu$. When using 109 gms. of $Y_{1.9}Eu_{0.1}O_3$ a luminescent oxysulphide is obtained which had a light output of 89% and a mean grain size of $15.4\mu$.

EXAMPLE V

The Examples I and II were repeated in which, however, lithium polysulphide was used which was manufactured by mixing 130 gms. of sulphur with a boiling suspension of 60 gms. of LiOH in 100 mls. of water. When using 435 gms. of mixed oxide a luminescent oxysulphide defined by the formula $Y_{1.9}Eu_{0.1}O_2S$ was obtained whose light output was 100% and the mean grain size is $7.5\mu$. When using 218 gms. of $Y_{1.9}Eu_{0.1}O_3$ the light output of the final product was 94% and the mean grain size was $10.9\mu$.

EXAMPLE VI

Example II was repeated several times in which, however, different firing times were used (firing temperature always 1150° C.). The table below states the results of measurements on the final products obtained.

| Firing time in hours | Light output in percent | Mean grain size in $\mu$ |
|---|---|---|
| 1 | 99 | 6.8 |
| 2 | 113 | 7.0 |
| 3 | 100 | 8.1 |
| 16 | 103 | 10.4 |

EXAMPLE VII

Example II was repeated several times in which, however, different firing temperatures were used (firing time always 2 hours). The table below states the results of measurements on the final products obtained.

| Firing time in ° C. | Light output in percent | Mean grain size in $\mu$ |
|---|---|---|
| 1,000 | 106 | 5.6 |
| 1,050 | 107 | 5.6 |
| 1,100 | 105 | 5.9 |
| 1,150 | 113 | 7.0 |
| 1,200 | 105 | 8.0 |
| 1,350 | 86 | |

EXAMPLE VIII

Example II was repeated several times with the difference that a covered alundum crucible was used which was directly placed in a furnace heated to a temperature of 1150° C. After having been heated for 2 hours at this temperature the crucible was removed from the furnace. The average light output of the final products was found to be approximately 115%. During these experiments nitrogen was not passed into the furnace and it was found that the final product did not contain any oxide.

EXAMPLE IX

A luminescent oxysulphide defined by the formula $La_{1.9}Eu_{0.1}O_2S$ was prepared by mixing a quantity of $La_{1.9}Eu_{0.1}O_3$ with 45 mol percent of $Na_2S_4$ prepared as in Example I. The mixture was fired for 2 hours at a temperature of 1070° C. The light output of the final product obtained was 114%.

EXAMPLE X

A luminescent oxysulphide defined by the formula $La_{1.9}Eu_{0.1}O_2S$ was prepared by mixing a quantity of $La_{1.9}Eu_{0.1}O_3$ with 50 mol percent of $Na_2S_4$ which was prepared as in Example I but which contained in addition an excess of 4 mol of S per mol of $Na_2S_4$. The light output of the final product obtained was 126%.

EXAMPLE XI

A luminescent oxysulphide defined by the formula $La_{1.88}Eu_{0.1}Sm_{0.02}O_2S$ was prepared by mixing a dry mixture of 0.94 mol of $La_2O_3$, 0.05 mol of $Eu_2O_3$ and 0.01 mol of $Sm_2O_3$ with 0.5 mol of $Na_2S_4$ and 2 mol of S. The solution of sodium polysulphide and sulphur was prepared in a manner as stated in Example I in which, however, an excess of sulphur was used. When excited by electrons the light output of the product obtained was 93% and the emitted radiation turned out to be somewhat redder than that of the oxysulphide according to Example X.

What is claimed is:

1. A method of manufacturing a luminescent oxysulphide defined by the formula $M'_{(2-x)}M_x''O_2S$ in which M' represents at least one of the elements yttrium, gadolinium and lanthanum and M" represents at least one of the rare earths having an atomic number of between 57 and 64 and between 64 and 71 and $x$ is a number having a value of between 0.0002 and 0.2 in which a mixture of a polysulphide of at least one of the alkali metals with oxides of the elements M' and M" or with a mixed oxide of these elements is heated at a high temperature, characterized in that an alkali metal polysulphide is first manufactured by adding sulphur to a concentrated aqueous solution of alkali metal hydroxide, that subsequently the oxide(s) of the elements M' and M" is (are) added to this solution and thereafter the mixture thus obtained is heated at a high temperature while being shut off from the air.

2. A method as claimed in claim 1, characterized in that the solution contains at least 15% by weight of alkali metal hydroxide.

3. A method as claimed in claim 1, characterized in that the solution is heated at a temperature of between 80° C. and the boiling point of the solution before the addition of sulphur.

4. A method as claimed in claim 1, characterized in that from 1.5 to 2 gram atoms of sulphur per gram molecule of alkali metal hydroxide are added to the alkali metal hydroxide solution.

5. A method as claimed in claim 1, characterized in that the sulphur solution is mixed with 0.1 to 5 gms. of oxide of the elements M' and M" per gram of sulphur.

6. A method as claimed in claim 1, characterized in that the heat treatment is effected for 0.25 to 8 hours at a temperature of between 1000 and 1350° C. is a closed crucible.

7. A method as claimed in claim 1, characterized in that the reaction product is leached with water after the heat treatment.

References Cited

UNITED STATES PATENTS 3,502,590   3/1970   Royce _____ 252—301.4 S

ROBERT D. EDMONDS, Primary Examiner

U.S. Cl. X.R.
23—20, 134